United States Patent
Haugen et al.

(10) Patent No.: US 9,399,951 B2
(45) Date of Patent: Jul. 26, 2016

(54) MODULAR LOUVER SYSTEM

(75) Inventors: Christina Granger Morrissey Haugen, Monroe, OH (US); Bradley Willis Fintel, West Chester, OH (US); Brian Richard Green, West Chester, OH (US); Kevin Samuel Klasing, Springboro, OH (US)

(73) Assignee: General Electric Company, Schenectady, NY (US)

( * ) Notice: Subject to any disclaimer, the term of this patent is extended or adjusted under 35 U.S.C. 154(b) by 1002 days.

(21) Appl. No.: 13/448,517

(22) Filed: Apr. 17, 2012

(65) Prior Publication Data

US 2013/0269366 A1    Oct. 17, 2013

(51) Int. Cl.
*F02C 6/08* (2006.01)
*F02K 3/075* (2006.01)
*F02C 3/13* (2006.01)
*F02C 9/18* (2006.01)

(52) U.S. Cl.
CPC ... *F02C 6/08* (2013.01); *F02C 3/13* (2013.01); *F02C 9/18* (2013.01); *F02K 3/075* (2013.01); *F05D 2260/50* (2013.01); *Y02T 50/672* (2013.01)

(58) Field of Classification Search
CPC ............. F02C 6/08; F02C 9/18; F02C 3/13; F02C 7/141; F02K 3/075; F02K 1/766; F02K 1/008; F02K 1/763; F05D 2240/12; F05D 2240/129
See application file for complete search history.

(56) References Cited

U.S. PATENT DOCUMENTS

| | | | |
|---|---|---|---|
| 700,785 A | 5/1902 | Kull |
| 1,473,349 A | 11/1923 | Kach |
| 1,539,595 A | 5/1925 | Powell |
| 1,697,794 A | 1/1929 | Stranahan |
| 1,794,276 A | 2/1931 | Bowes |
| 2,701,557 A | 2/1955 | Ramey |
| 2,919,761 A | 1/1960 | Smith |
| 2,929,248 A | 3/1960 | Sprenkle |
| 3,016,972 A | 1/1962 | Dugas |
| 3,092,206 A | 6/1963 | Moreau |

(Continued)

FOREIGN PATENT DOCUMENTS

| | | |
|---|---|---|
| CN | 1840864 A | 10/2006 |
| EP | 2136053 | 12/2009 |

(Continued)

OTHER PUBLICATIONS

GB Search Report and Opinion issued Oct. 26, 2011, in corresponding U.S. Appl. No. 13/178,159.

(Continued)

*Primary Examiner* — Phutthiwat Wongwian
*Assistant Examiner* — Stefan Ibroni
(74) *Attorney, Agent, or Firm* — General Electric Company; William Scott Andes (57) ABSTRACT

Louver systems for gas turbine bleed air systems are disclosed. An example louver system may include a bleed system discharge opening arranged to vent bleed air from a bleed flow conduit and a plurality of pivotable louvers disposed proximate the discharge opening, the pivotable louvers being pivotable between a shut position and an open position. In the shut position, individual louvers may at least partially obstruct the discharge opening. In the open position, individual louvers may at least partially control a direction of flow of the bleed air exiting the discharge opening.

19 Claims, 6 Drawing Sheets

(56) References Cited

U.S. PATENT DOCUMENTS

| | | |
|---|---|---|
| 3,105,570 A | 10/1963 | Bezemes |
| 3,120,877 A | 2/1964 | Morris et al. |
| 3,159,238 A | 12/1964 | Shearer |
| 3,191,630 A | 6/1965 | Demyan |
| 3,338,331 A | 8/1967 | Jettinghoff |
| 3,398,881 A | 8/1968 | Greenberg et al. |
| 3,493,169 A | 2/1970 | Abild et al. |
| 3,545,492 A | 12/1970 | Scheid |
| 3,572,391 A | 3/1971 | Hirsch |
| 3,632,223 A | 1/1972 | Hampton |
| 3,665,965 A | 5/1972 | Baumann |
| 3,692,140 A | 9/1972 | Smith |
| 3,777,489 A | 12/1973 | Johnson et al. |
| 3,840,051 A | 10/1974 | Akashi et al. |
| 3,945,759 A | 3/1976 | Bobo |
| 3,951,566 A | 4/1976 | Mattei et al. |
| 3,964,519 A | 6/1976 | De Baun |
| 4,022,112 A | 5/1977 | Putt et al. |
| 4,113,050 A | 9/1978 | Smith |
| 4,128,769 A | 12/1978 | Bons et al. |
| 4,130,173 A | 12/1978 | Cooksey |
| 4,132,285 A | 1/1979 | Milde et al. |
| 4,142,413 A | 3/1979 | Bellinga |
| 4,156,344 A | 5/1979 | Cuthbertson et al. |
| 4,177,780 A | 12/1979 | Pellerin |
| 4,244,440 A | 1/1981 | Matta et al. |
| 4,244,441 A | 1/1981 | Tolman |
| 4,375,841 A | 3/1983 | Vielbig |
| 4,463,552 A | 8/1984 | Monhardt et al. |
| 4,537,277 A | 8/1985 | Bryce |
| 4,610,326 A | 9/1986 | Kirchweger et al. |
| 4,685,533 A | 8/1987 | Piesik |
| 4,823,547 A * | 4/1989 | Newton ............ 60/226.2 |
| 4,890,691 A | 1/1990 | Ching-ho |
| 4,979,587 A | 12/1990 | Hirt et al. |
| 5,205,719 A | 4/1993 | Childs et al. |
| 5,261,228 A | 11/1993 | Shuba |
| 5,266,754 A | 11/1993 | Swift |
| 5,327,941 A | 7/1994 | Bitsakis et al. |
| 5,428,954 A | 7/1995 | Cowan, Sr. |
| 5,429,102 A | 7/1995 | Edwards et al. |
| 5,495,872 A | 3/1996 | Gallagher et al. |
| 5,557,917 A | 9/1996 | Jaw |
| 5,706,649 A * | 1/1998 | Robinson et al. ......... 60/226.2 |
| 5,758,488 A | 6/1998 | Batey |
| 5,845,482 A * | 12/1998 | Carscallen ............ 60/785 |
| 6,145,544 A | 11/2000 | Dutertre et al. |
| 6,415,747 B1 | 7/2002 | Asano et al. |
| 6,558,137 B2 | 5/2003 | Tomell et al. |
| 6,565,313 B2 | 5/2003 | Nikkanen et al. |
| 6,588,195 B2 | 7/2003 | Negulescu |
| 6,695,094 B2 | 2/2004 | Moffat et al. |
| 6,776,589 B2 | 8/2004 | Tomell et al. |
| 6,880,579 B2 | 4/2005 | Boger |
| 7,089,963 B2 | 8/2006 | Meheen |
| 7,146,961 B1 | 12/2006 | Westcott |
| 7,210,912 B2 | 5/2007 | Tomell et al. |
| 7,267,297 B2 | 9/2007 | Campbell et al. |
| 7,344,107 B2 | 3/2008 | Campbell et al. |
| 7,364,116 B2 | 4/2008 | Nguyen et al. |
| 7,367,424 B2 | 5/2008 | Brown et al. |
| 7,387,188 B2 | 6/2008 | Keller et al. |
| 7,431,125 B2 | 10/2008 | Williams |
| 7,448,469 B2 | 11/2008 | Seyler et al. |
| 7,513,119 B2 | 4/2009 | Zielinski et al. |
| 7,549,838 B2 | 6/2009 | Touyeras |
| 7,611,093 B2 | 11/2009 | Campbell et al. |
| 7,730,995 B2 | 6/2010 | Hunt et al. |
| 7,762,374 B2 | 7/2010 | Turner et al. |
| 7,765,784 B2 | 8/2010 | Lwasa et al. |
| 7,797,945 B2 | 9/2010 | Appleby et al. |
| 7,798,285 B2 | 9/2010 | Chiou et al. |
| 7,891,605 B2 | 2/2011 | Nguyen et al. |
| 8,016,071 B1 | 9/2011 | Martinus et al. |
| 8,484,982 B2 * | 7/2013 | Martensson et al. ......... 60/785 |
| 8,511,096 B1 | 8/2013 | Haugen et al. |
| 2004/0238123 A1 | 12/2004 | Becknell |
| 2005/0067218 A1 | 3/2005 | Bristow et al. |
| 2005/0249578 A1 | 11/2005 | Leblanc et al. |
| 2007/0261410 A1 * | 11/2007 | Frank ............ F01D 17/105 60/785 |
| 2010/0043447 A1 | 2/2010 | Kirby |
| 2010/0236256 A1 | 9/2010 | Hussain et al. |
| 2011/0265490 A1 | 11/2011 | Klasing et al. |
| 2012/0006615 A1 | 1/2012 | Klasing et al. |

FOREIGN PATENT DOCUMENTS

| | | |
|---|---|---|
| EP | 2184447 | 12/2010 |
| EP | 2184448 | 12/2010 |

OTHER PUBLICATIONS

Phong et al., "Noise Reduction of a Turbofan Bleed Valve," 50th AIAA Aerospace Sciences Meeting, Nashville, Tennessee, Jan. 9-12, 2012.

Unofficial English translation of Office Action issued in connection with corresponding CN Application No. 201310133088.X on Sep. 14, 2015.

US 7,270,294, 09/2007, Campbell (withdrawn)

* cited by examiner

MODULAR LOUVER SYSTEM

BACKGROUND

The subject matter disclosed herein relates generally to bleed air systems for gas turbine engines, and, more specifically, to bleed air systems capable of providing pressure drops, acoustic improvements, and desirable flow properties.

In a gas turbine engine, air is pressurized in a compression module. The air channeled through the compression module is mixed with fuel in a combustor and ignited, generating hot combustion gases, which flow through turbine stages that extract energy therefrom for powering the fan and compressor rotors and generate engine thrust to propel an aircraft in flight or to power a load, such as an electrical generator.

In some gas turbine engines, a portion of the high-pressure air, such as, for example, bleed air from a compressor, may be extracted or bled from the compressor for various needs. These needs include, for example, compressor flow bleeding which may be used to improve operability as well as to provide turbine cooling, bearing sump pressurization, purge air, or aircraft environment control. The air may be bled off from the compressor using bleed slots located over specific portions or stages of the compressor.

In at least some gas turbine engines, during engine operation occurring in some operating conditions, the compressor may pump more air than is required for needs including the combustion process. In order to manage operability of the engine and combustion performance, a portion of the excess bleed air from the compressor may be routed through bleed conduits and exhausted into the bypass flow stream, engine exhaust, or to ambient. The pressure and temperature of the air stream bled from the compressor may be very high. For example, bleed air pressure may be greater than about 1375 kPa and the bleed air temperature may be greater than about 538 degrees C. A transient bleed valve system (TBV) system and/or a variable bleed valve (VBV) system is sometimes used for bleeding and exhausting the air removed from the compressor. For example, the exhaust area of some conventional bleed systems may be oversized to lower the flow velocity at the exhaust location to assure that the acoustic requirements are met for the application. The exhaust area, as well as the expansions between the source pressure and exhaust, may contribute to the large size and/or weight of these systems.

In addition, some exhaust designs on aircraft may require extensive thermal shielding on other components near the exhaust location. Due to the nature of the high temperature and high pressure air, once it is discharged into the flow path, it may overwhelm the flowpath stream, causing the bleed air to impinge on the surrounding structure around the engine. In some aircraft, the surrounding structure may be made of lightweight composite material or of other metallic material with lesser temperature capability.

The problem: In some applications (e.g., aircraft), it may be necessary to direct bleed air flow into the bypass stream to avoid thermal damage to bypass duct components.

BRIEF DESCRIPTION

At least one solution for the above-mentioned problem(s) is provided by the present disclosure to include example embodiments, provided for illustrative teaching and not meant to be limiting.

An example louver system for a gas turbine engine bleed system according to at least some aspects of the present disclosure may include a bleed system discharge opening arranged to vent bleed air from a bleed flow conduit and/or a plurality of pivotable louvers disposed proximate the discharge opening, the pivotable louvers being pivotable between a shut position and an open position. In the shut position, individual louvers may at least partially obstruct the discharge opening. In the open position, individual louvers may at least partially control a direction of flow of the bleed air exiting the discharge opening.

An example gas turbine engine according to at least some aspects of the present disclosure may include a compressor; a combustor arranged to combust fuel in compressed air received from the compressor; a turbine configured to receive hot, pressurized gas from the combustor and to drive the compressor; a bleed conduit arranged to receive bleed air from the compressor; and/or a louver system operatively coupled to the bleed conduit. The louver system may include a plurality of louvers disposed in a discharge opening, the plurality of louvers being pivotable between a shut position and an open position.

An example method of operating a bleed system associated with a gas turbine engine according to at least some aspects of the present disclosure may include receiving a flow of bleed air from a compressor of a gas turbine engine at a discharge opening; pivoting a plurality of louvers disposed in the discharge opening from a shut position to an open position; discharging the flow of bleed air through the discharge opening; and directing the flow of bleed air through the discharge opening using the plurality of louvers.

BRIEF DESCRIPTION OF THE DRAWINGS

The subject matter for which patent claim coverage is sought is particularly pointed out and claimed herein. The subject matter and embodiments thereof, however, may be best understood by reference to the following description taken in conjunction with the accompanying drawing figures in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure includes, inter alia, gas turbine engines, bleed air systems, and methods of operating bleed air systems.

Figure 1:
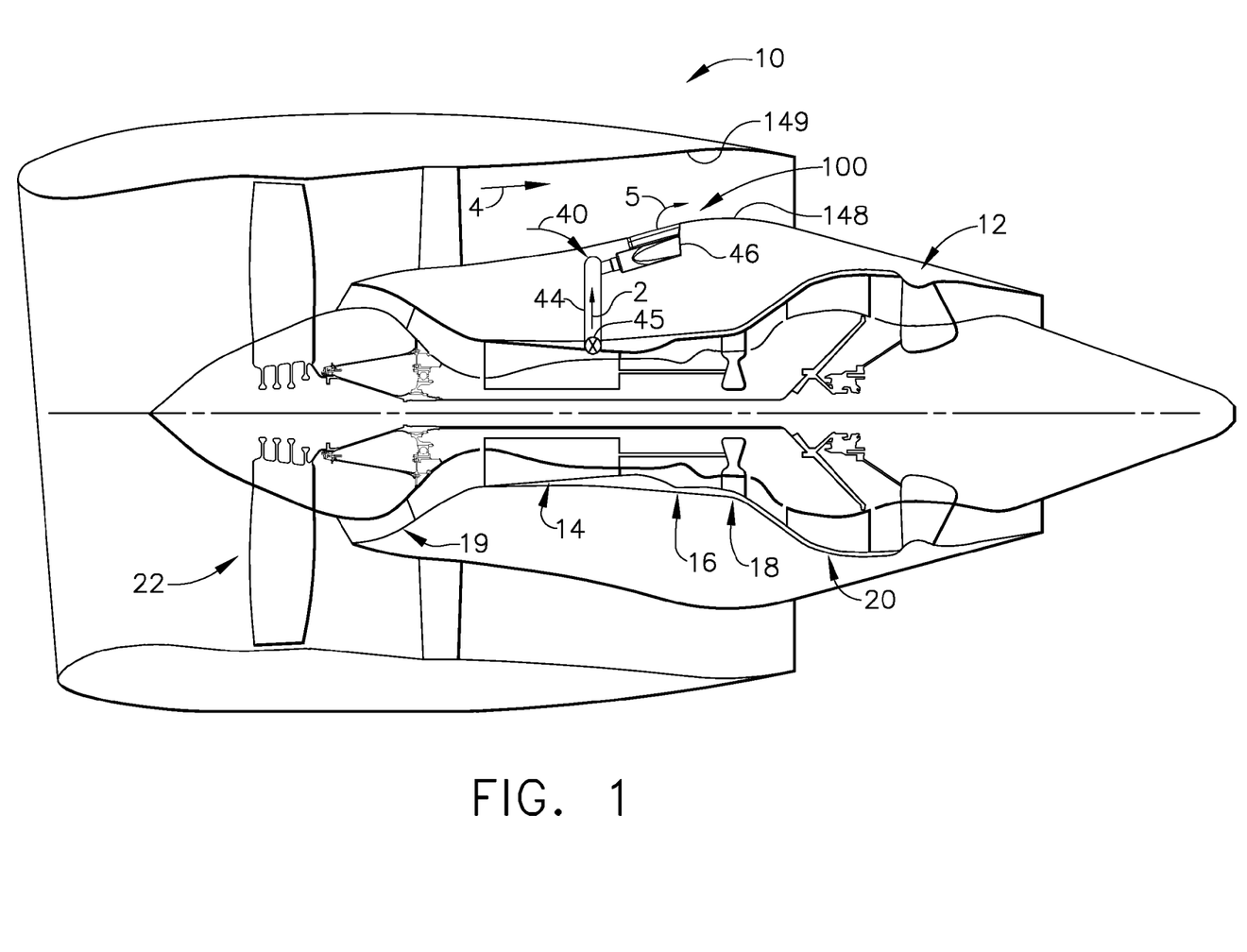
FIG. 1 is a schematic cross-sectional view of a gas turbine engine including an example louver system.

FIG. 1 is a schematic cross-sectional view of a gas turbine engine (GTE) 10 including an example louver system 100, according to at least some aspects of the present disclosure. GTE 10 may include a bleed system 40, which may incorporate louver system 100. GTE 10 may include a core gas turbine engine 12 that includes a high-pressure compressor 14, a combustor 16, and/or a high-pressure turbine 18. GTE 10 may also include a low-pressure compressor 19, a low-pressure turbine 20, and/or a fan assembly 22.

In operation, air may flow through fan assembly 22. A portion of the air discharged from fan assembly 22 may be channeled to high-pressure compressor 14, where it may be further compressed and channeled to combustor 16. Products of combustion from combustor 16 may be utilized to drive high-pressure turbine 18 and/or low-pressure turbine 20. Another portion of the air discharged from fan assembly 22 may bypass core gas turbine engine 10 and/or may be referred to as a bypass flow stream 4.

At some operating conditions, a portion of the compressed air produced by high-pressure compressor 14 may be routed through bleed system 40, thereby becoming bleed air 2. Bleed air 2 from high-pressure compressor 14 may enter a bleed flow conduit 44. Bleed air 2 may pass through bleed flow conduit 44, a muffling device 46, and/or louver system 100, which may direct bleed air 2 into a flow path, such as the bypass flow stream 4. Bypass flow stream 4 may flow through a duct at partially defined by bypass duct walls 148, 149. Flow of bleed air 2 through bleed flow conduit 44 may be controlled by a transient bleed valve 45.

In some example embodiments, transient bleed valve 45 may fluidicly interpose compressor 14 and bleed conduit 44. Muffling device 46 may fluidicly interpose bleed conduit 44 and discharge opening 48. An example muffling device 46 that may be used in connection with louver systems of the present disclosure is described in co-pending U.S. patent application Ser. No. 13/448,470, now U.S. Pat. No. 8,511,096, filed on even date herewith, which is titled "HIGH BLEED FLOW MUFFLING SYSTEM," and which is incorporated herein by reference.

Louver system 100, described in more detail below, may be in flow communication with bleed flow conduit 44 such that bleed air 2 is discharged as exit flow stream 5 into bypass flow stream 4. Louver system 100 may direct exit flow stream 5 and/or may facilitate mixing of exit flow stream 5 and bypass flow stream 4. Some example embodiments may include one or more structures configured to assist in controlling exit flow stream 5, such as an aero chimney, as described in U.S. Patent Application Publication No. 2011/0265490, which is incorporated herein by reference.

Figure 2:
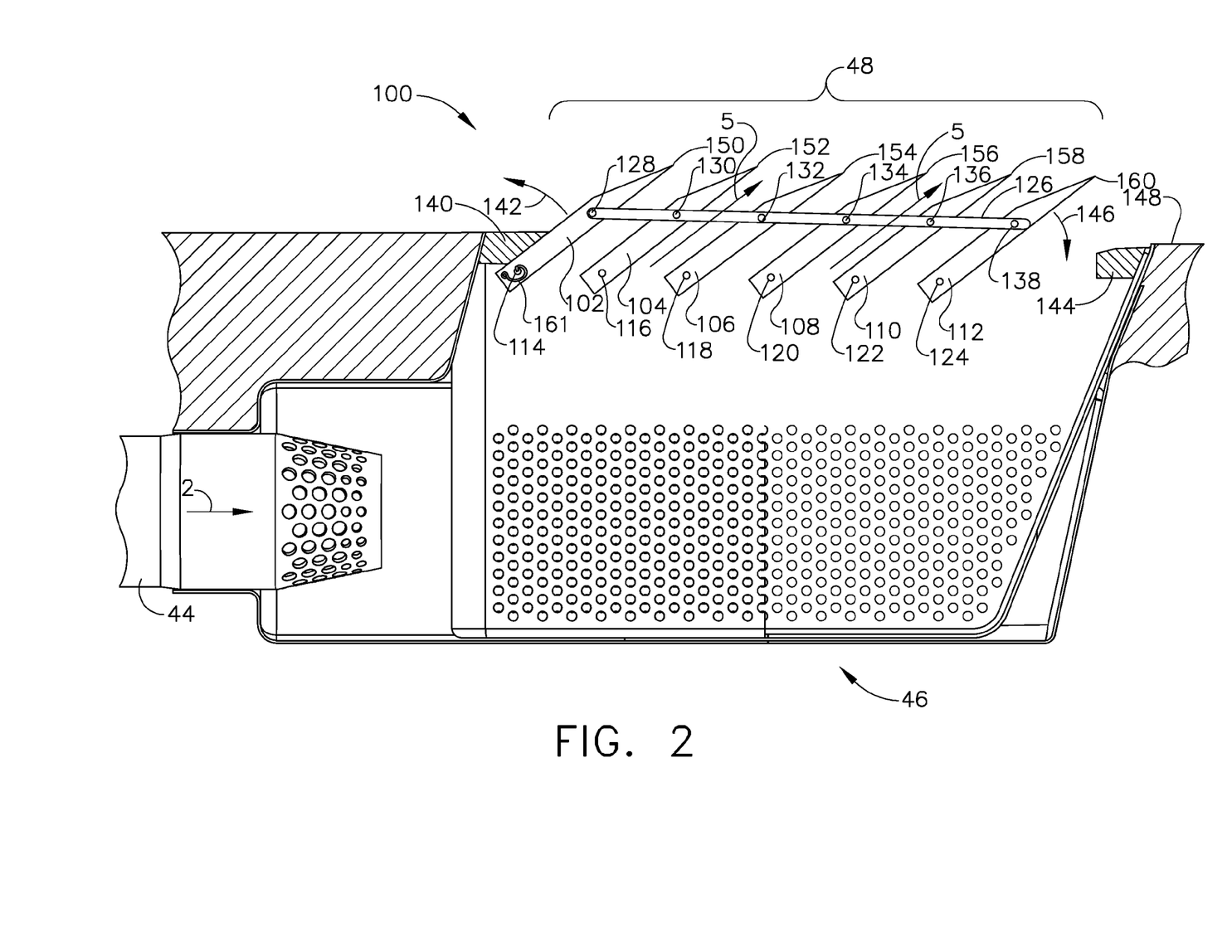
FIG. 2 is a cross-sectional view of an example louver system in an open position.
Figure 3:
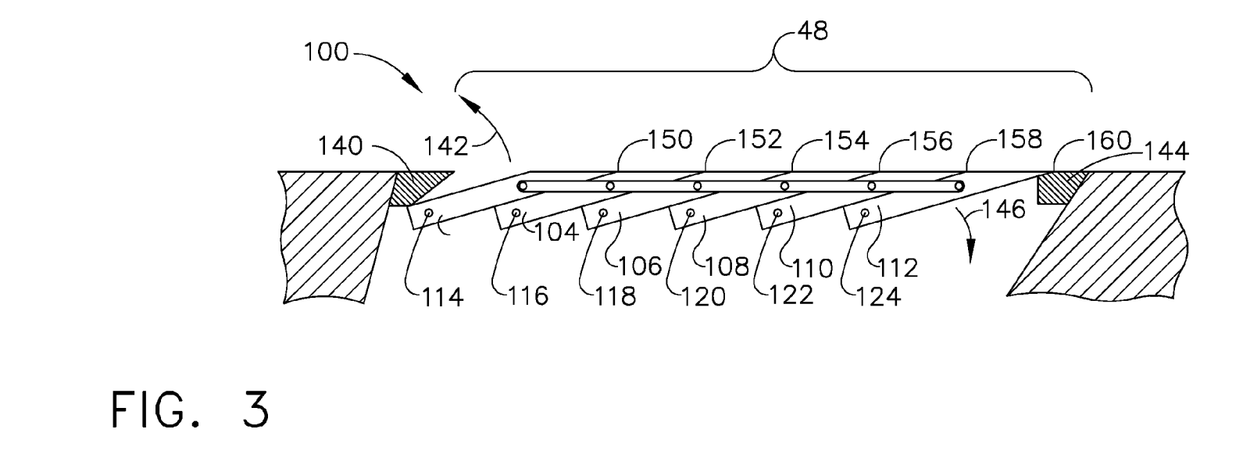
FIG. 3 is a cross-sectional view of an example louver system in a shut position.

FIG. 2 is a cross-sectional view of an example louver system 100 in an open position, according to at least some aspects of the present disclosure. FIG. 3 is a cross-sectional view of an example louver system 100 in a shut position, according to at least some aspects of the present disclosure. Louver system 100 may be disposed proximate a bleed system discharge opening 48, which may be arranged to vent bleed air from a bleed conduit 44. Louver system 100 may include a plurality of louvers 102, 104, 106, 108, 110, 112, which may pivotably disposed, such as by pivot pins 114, 116, 118, 120, 122, 124, respectively.

Louvers 102, 104, 106, 108, 110, 112 may comprise respective trailing edges 150, 152, 154, 156, 158, 160. In some example embodiments, trailing edges 150, 152, 154, 156, 158, 160 may be located generally opposite pivot pins 114, 116, 118, 120, 122, 124, respectively. Pivot pins 114, 116, 118, 120, 122, 124 may be generally upstream and trailing edges 150, 152, 154, 156, 158, 160 may be generally downstream with respect to bleed air 2 and/or exit flow stream 5.

Louvers 102, 104, 106, 108, 110, 112 may be pivotable between an open position (e.g., FIG. 2) and a shut position (e.g., FIG. 3). In an example open position, individual louvers 102, 104, 106, 108, 110, 112 may at least partially control a direction of exit flow stream 5 of bleed air 2 exiting discharge opening 48. For example, when open, louvers 102, 104, 106, 108, 110, 112 may direct exit flow stream 5 generally upward and to the right in FIG. 2. An example louver system 100 installed in a turbofan aircraft engine may be configured to use louvers 102, 104, 106, 108, 110, 112 to direct exit flow 5 generally away from bypass duct walls 148, 149 (FIG. 1).

In an example shut position, individual louvers 102, 104, 106, 108, 110, 112 may at least partially obstruct discharge opening 48. In the shut position, the plurality of louvers 102, 104, 106, 108, 110, 112 may substantially obstruct discharge opening 48. In some example embodiments, such as in aircraft turbofan engines, substantially obstructing discharge opening 48 when shut may enable louvers 102, 104, 106, 108, 110, 112 to prevent acoustic effects (e.g., whistling) and/or undesirable flow effects that may be caused by a substantially open discharge opening 48 with substantially no exit flow stream 5.

In some example embodiments, louver system 48 may include a connecting rod 126 operatively coupled to two or more individual louvers 102, 104, 106, 108, 110, 112. Some example embodiments may include more than one connecting rod (see, e.g., FIG. 5). Returning to FIGS. 2 and 3, connecting rod 126 may be pivotably connected to louvers 102, 104, 106, 108, 110, 112 by pivot pins 128, 130, 132, 134, 136, 138. Connecting rod 126 may provide substantially coordinated pivoting of louvers 102, 104, 106, 108, 110, 112. For example, louvers 102, 104, 106, 108, 110, 112 may pivot between open and shut positions in a substantially coordinated manner.

In some example embodiments, louver system 100 may include an open position stopper 140, which may be arranged to limit pivoting of one or more of louvers 102, 104, 106, 108, 110, 112 in an opening direction 142 (e.g., FIG. 3). For example, open position stopper 140 may directly limit pivoting of louver 102 in opening direction 142 by impeding rotation of louver 102 beyond a predetermined amount. Louvers 104, 106, 108, 110, 112 may also be limited in pivoting in opening direction 142 by louver 102 contacting open position stopper 140 because louvers 102, 104, 106, 108, 110, 112 may be linked together by connecting rod 126.

In some example embodiments, louver system 100 may include a shut position stopper 144, which may be arranged to limit pivoting of one or more of louvers 102, 104, 106, 108, 110, 112 in a shutting direction 146 (e.g., FIG. 3). For example, shut position stopper 144 may directly limit pivoting of louver 112 in shutting direction 146 by impeding rotation of louver 112 beyond a predetermined amount. Louvers 102, 104, 106, 108, 110 may also be limited in pivoting in shutting direction 146 by louver 112 contacting shut position stopper 144 because louvers 102, 104, 106, 108, 110, 112 may be linked together by connecting rod 126 and/or because louvers 102, 104, 106, 108, 110 may lie against louvers 104, 106, 108, 110, 112, respectively, in the shut position.

Some example embodiments according to at least some aspects of the present disclosure may include more than one open position stopper 140 and/or more than one shut position stopper 144 (e.g., FIG. 3). An example embodiment may include open position stoppers 140 and/or shut position stopper 144 associated with individual louvers 102, 104, 106, 108, 110, 112 and/or with groups of louvers 102, 104, 106, 108, 110, 112.

In some example embodiments, louvers 102, 104, 106, 108, 110, 112 may pivot from the shut position to the open position upon receiving bleed air flow from compressor 14. For example, a pressure differential across shut louvers 102, 104, 106, 108, 110, 112 may cause louvers 102, 104, 106, 108, 110, 112 to open. Upon substantially stopping the flow of bleed air 2 from compressor 14, louvers 102, 104, 106, 108, 110, 112 may pivot from the open position to the shut position. Louvers 102, 104, 106, 108, 110, 112 may remain in the shut position during conditions when there is substantially no bleed air 2 flow.

Figure 4:
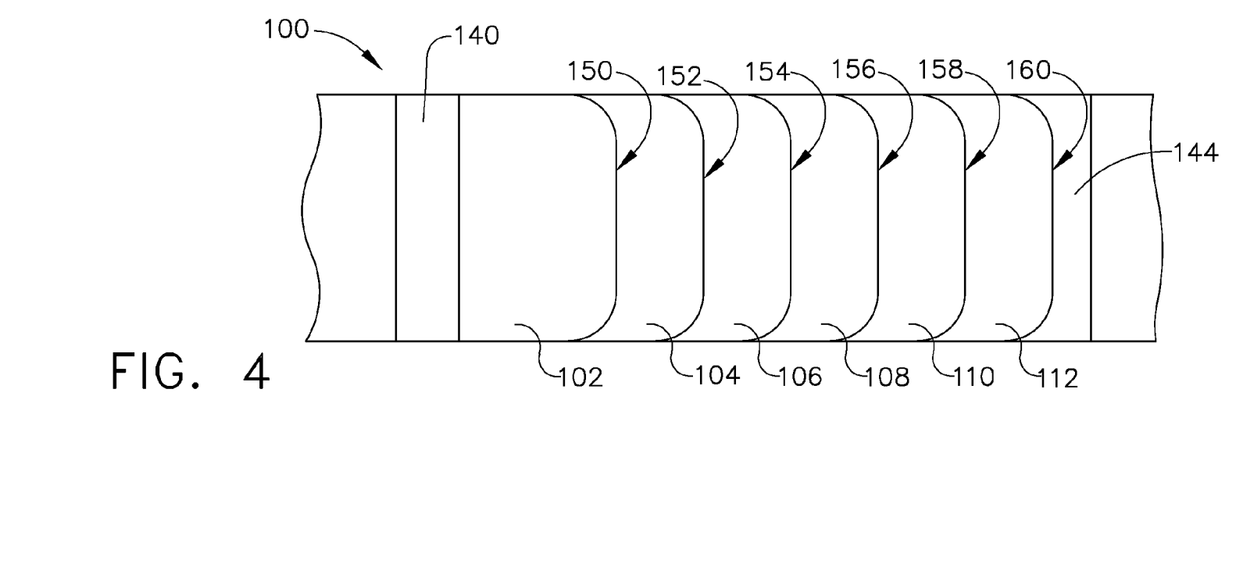
FIG. 4 is a plan view of an example louver system.

FIG. 4 is a plan view of an example louver system 100, according to at least some aspects of the present disclosure. In some example embodiments, trailing edges 150, 152, 154, 156, 158, 160 may be generally straight and/or may include rounded peripheral corners.

Figure 5:
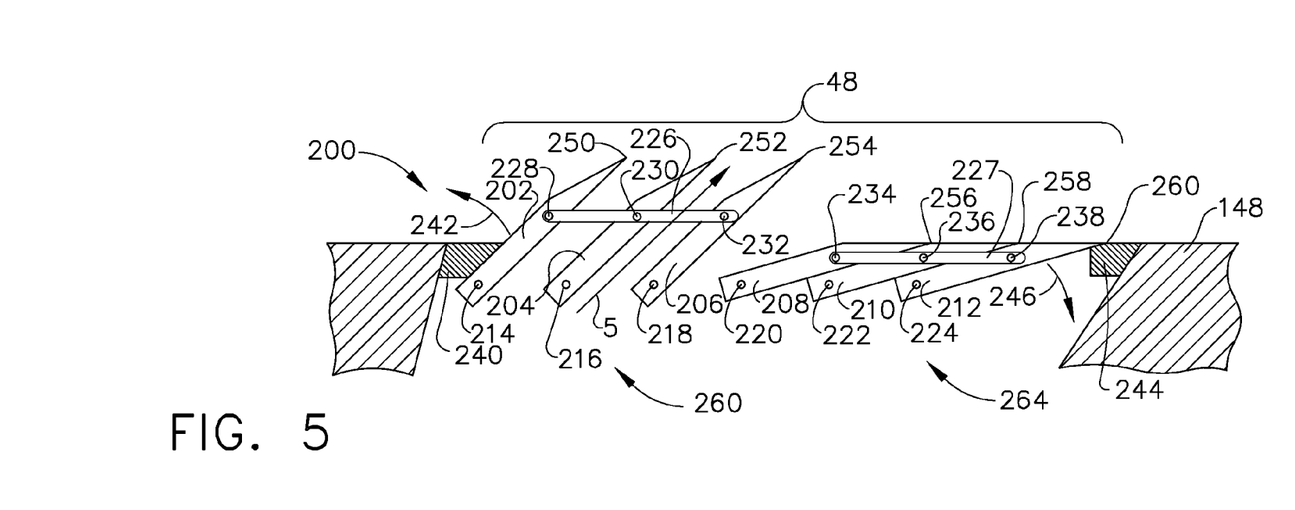
FIG. 5 is a cross-sectional view of an example louver system including a first connecting rod and a second connecting rod.

FIG. 5 is a cross-sectional view of an example louver system 200 including a first connecting rod 226 and a second connecting rod 227, according to at least some aspects of the present disclosure. Louver system 200 may be mounted in bleed system discharge opening 48. Louver system 200 may include a plurality of louvers 202, 204, 206, 208, 210, 212, which may pivotably disposed, such as by pivot pins 214, 216, 218, 220, 222, 224, respectively.

Louvers 202, 204, 206, 208, 210, 212 may comprise respective trailing edges 250, 252, 254, 256, 258, 260 (e.g., FIG. 5). In some example embodiments, trailing edges 250, 252, 254, 256, 258, 260 may be located generally opposite pivot pins 214, 216, 218, 220, 222, 224, respectively. Pivot pins 214, 216, 218, 220, 222, 224 may be generally upstream and trailing edges 250, 252, 254, 256, 258, 260 may be generally downstream with respect to exit flow stream 5.

Generally similar to louver system 100, louvers 202, 204, 206, 208, 210, 212 of louver system 200 may be pivotable between an open position (e.g., louvers 202, 204, 206) and a shut position (e.g., louvers 208, 210, 212) (e.g., FIG. 5). In an example open position, individual louvers 202, 204, 206, 208, 210, 212 may at least partially control a direction of exit flow stream 5 of bleed air 2 exiting discharge opening 48. For example, when open, one or more louvers 202, 204, 206, 208, 210, 212 may direct exit flow stream 5 generally upward and to the right in FIG. 5. An example louver system 200 installed in a turbofan aircraft engine may be configured to use one or more louvers 202, 204, 206, 208, 210, 212 to direct exit flow 5 generally away from bypass duct walls 148, 149.

In an example shut position, individual louvers 202, 204, 206, 208, 210, 212 may at least partially obstruct discharge opening 48. In the shut position, the plurality of louvers 202, 204, 206, 208, 210, 212 may substantially obstruct discharge opening 48.

In some example embodiments, first connecting rod 226 may be operatively coupled to two or more individual louvers 202, 204, 206 comprising a first group 262 of louvers and/or second connecting rod 227 may be operatively coupled to two or more individual louvers 208, 210, 212 comprising a second group 264 of louvers (e.g., FIG. 5). First connecting rod 226 may be pivotably connected to louvers 202, 204, 206 by pivot pins 228, 230, 232. First connecting rod 226 may provide substantially coordinated pivoting of first group 262 of louvers. For example, louvers 202, 204, 206 may pivot between open and shut positions in a substantially coordinated manner. Second connecting rod 227 may be pivotably connected to louvers 208, 210, 212 by pivot pins 234, 236, 238. Second connecting rod 227 may provide substantially coordinated pivoting of first group 264 of louvers. For example, louvers 208, 210, 212 may pivot between open and shut positions in a substantially coordinated manner.

In some example embodiments, louver system 200 may include an open position stopper 240, which may be arranged to limit pivoting of one or more of louvers 202, 204, 206, 208, 210, 212 in an opening direction 242. For example, open position stopper 240 may directly limit pivoting of louver 202 in opening direction 242 by impeding rotation of louver 202 beyond a predetermined amount. Louvers 204, 206 may also be limited in pivoting in opening direction 242 by louver 202 contacting open position stopper 240 because louvers 202, 204, 206 may be linked together by first connecting rod 226.

In some example embodiments, louver system 200 may include a shut position stopper 244, which may be arranged to limit pivoting of one or more of louvers 202, 204, 206, 208, 210, 212 in a shutting direction 246. For example, shut position stopper 244 may directly limit pivoting of louver 212 in shutting direction 246 by impeding rotation of louver 212 beyond a predetermined amount. Louvers 202, 204, 206, 208, 210 may also be limited in pivoting in shutting direction 246 by louver 212 contacting shut position stopper 244 because louvers 202, 204, 206, 208, 210, 212 may be linked together by first connecting rod 226 and/or second connecting rod 227 and/or because louvers 202, 204, 206, 208, 210 may lie against louvers 204, 206, 208, 210, 212, respectively, in the shut position.

In some example embodiments, first connecting rod 226 and second connecting rod 227 may be independently operable such that first group 262 of louvers and second group 264 of louvers may be at least partially independently pivotable (e.g., FIG. 5). For example, louver system 200 may be configured such that first group 262 of louvers may be open at low and high bleed air 2 flow rates and/or second group 264 of louvers may be open at relatively high bleed air 2 flow rates and may be shut at relatively low flow rates.

In an example embodiment, bleed air 2 flow may initially cause first group 262 of louvers to open, thereby discharging bleed air 2 as exit flow stream 5. Second group 264 of louvers may be maintained in the shut position. In response to an increase in bleed air 2 flow, second group 264 of louvers may pivot to the open position. If the flow rate of bleed air 2 decreases, second group 264 of louvers may pivot to the shut position. Upon substantially stopping the flow of bleed air 2 from compressor 14, first group 262 of louvers may pivot from the open position to the shut position.

Figure 6:
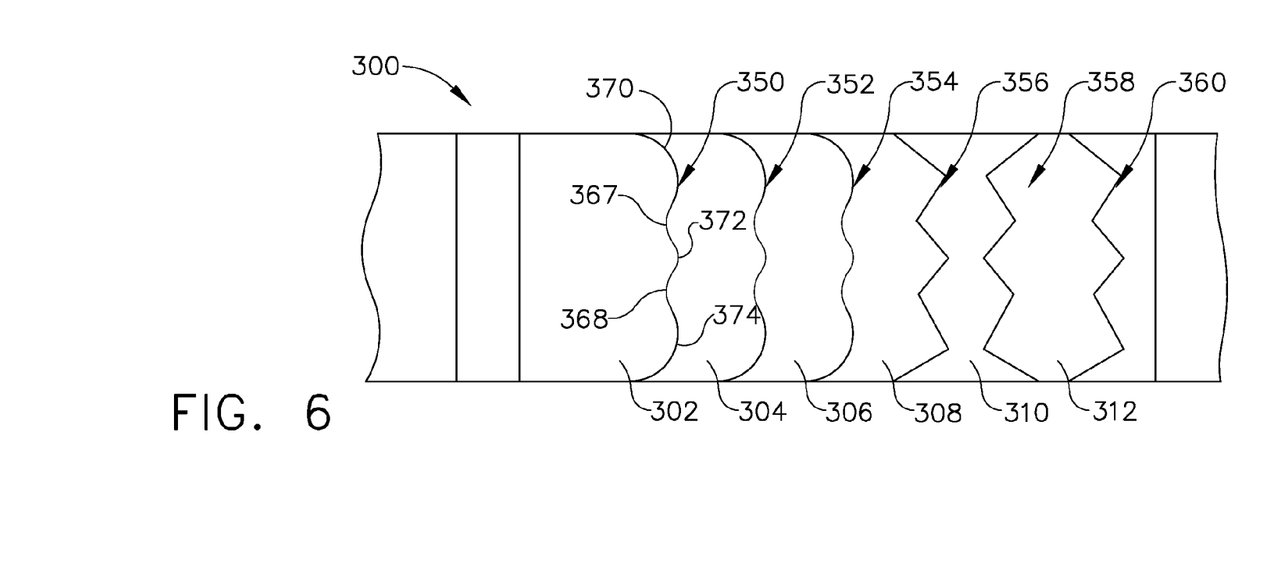
FIG. 6 is a plan view of an example louver system including louvers with scalloped or chevron trailing edges.

Some example embodiments according to at least some aspects of the present disclosure may include louvers comprising trailing edges with mixing features. For example, FIG. 6 is a plan view of an example louver system 300 including louvers 302, 304, 306, 308, 310, 312 with scalloped trailing edges 350, 352, 354 and/or chevron-shaped trailing edges 356, 358, 360, respectively, according to at least some aspects of the present disclosure. An example scalloped trailing edge 350 may include a plurality of alternating, generally curved projections 370, 372, 374 and/or recesses 376, 378. Some example embodiments may include a plurality of louvers having substantially the same shape of trailing edge, and some example embodiments may include a plurality of louvers having a plurality of different trailing edge shapes.

Figure 7:
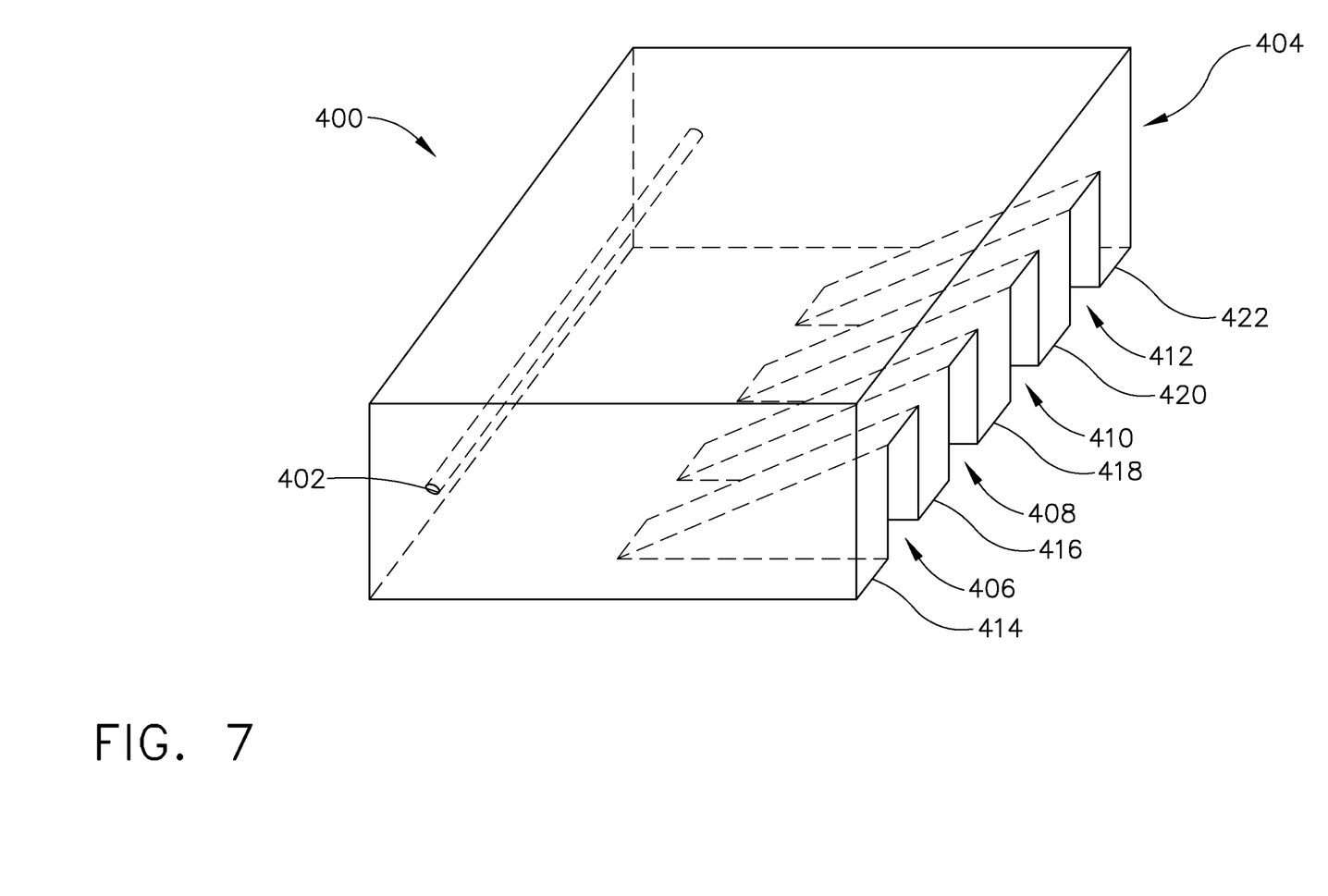
FIG. 7 is a perspective view of an example louver including a grooved trailing edge.

Another example mixing feature may comprise a grooved edge. FIG. 7 is a perspective view of an example louver 400 including a grooved trailing edge 404, according to at least some aspects of the present disclosure. Louver 400 may be pivotably mounted in a louver system generally as described in connection with other embodiments herein. For example, louver 400 may receive a pivot pin through hole 402. Trailing edge 404 may be grooved, including a plurality of recesses 406, 408, 410, 412 interposed between a plurality of projections 414, 416, 418, 420, 422. In some example embodiments, recesses 406, 408, 410, 412 may be located on an area of trailing edge 404 that is generally opposite bypass flow stream 4.

In some example embodiments, trailing edges with mixing features (e.g., scalloped edges and/or grooved edges) may improve mixing of exit flow stream 5 with bypass flow stream 4, for example. The sizes, proportions, and/or locations of projections 370, 372, 374, recesses 376, 378, projections 414, 416, 418, 420, 422, and/or recesses 406, 408, 410, 412 may be adjusted to achieve desired flow mixing characteristics.

Some example embodiments may include one or more dampers operatively connected to one or more louvers. Such dampers may prevent and or limit flutter of the louvers. An example damper 161 may comprise a torsion spring operatively coupled between louver 102 and pivot pin 114, which may be stationary. Damper 161 may initially resist opening movement of louver 102 until the differential pressure across louver 102 is sufficient to overcome the spring force. Alternative example damping systems may include one or more dampers operatively coupled to connecting rod 126 and/or one or more dampers operatively coupled between a rotating pivot pin 114 and a stationary part, such as open position stopper 140.

Figure 8:
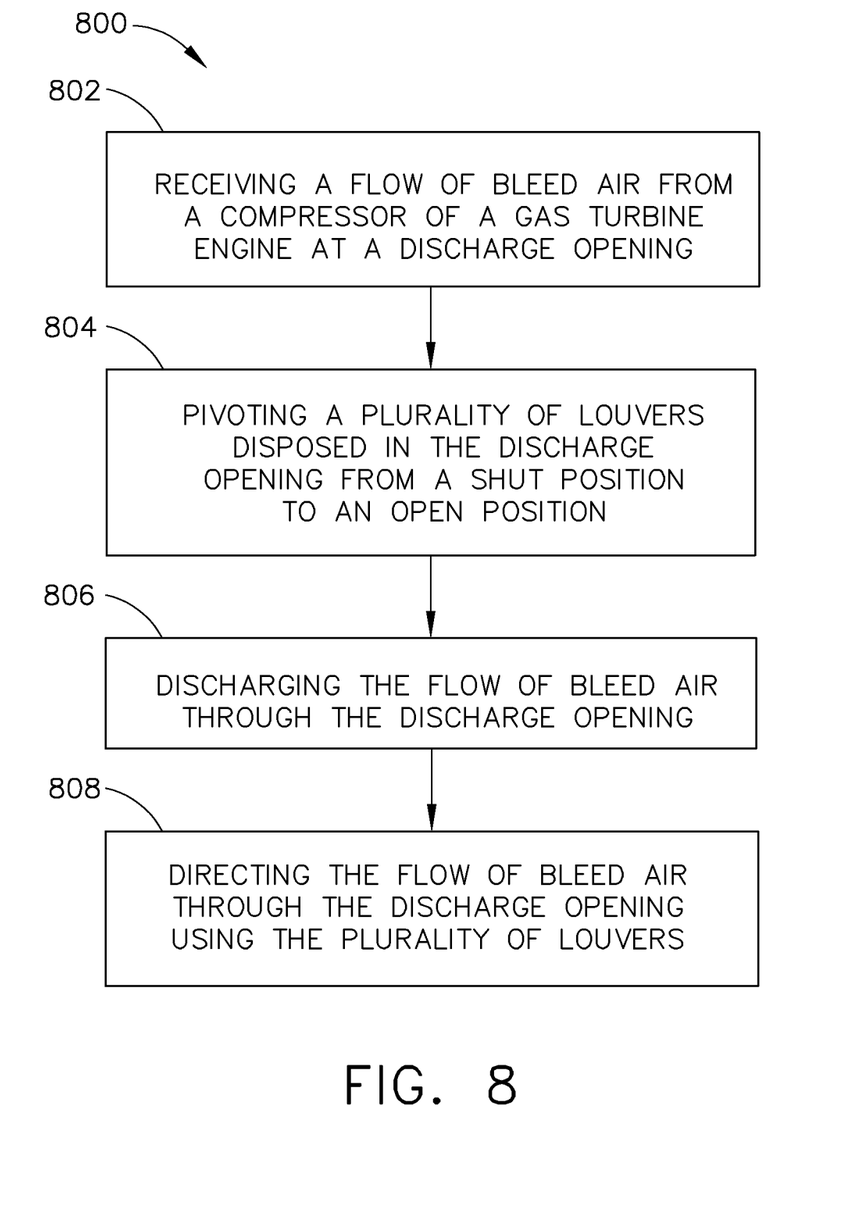
FIG. 8 is flow chart of an example method of operating a bleed system associated with a gas turbine engine, all in accordance with at least some aspects of the present disclosure.

FIG. 8 is flow chart of an example method 800 of operating a bleed system associated with a gas turbine engine, according to at least some aspects of the present disclosure. Method 800 may include an operation 802, which may include receiving a flow of bleed air from a compressor of a gas turbine engine at a discharge opening. Operation 802 may be followed by an operation 804, which may include pivoting a plurality of louvers disposed in the discharge opening from a shut position to an open position. Operation 804 may be followed by operation 806, which may include, discharging the flow of bleed air through the discharge opening. Operation 806 may be followed by operation 808, which may include directing the flow of bleed air through the discharge opening using the plurality of louvers.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A louver system for a gas turbine engine bleed system, the louver system comprising:
   a bleed system discharge opening arranged to vent bleed air from a bleed flow conduit; and
   a plurality of pivotable louvers disposed in a core engine casing and proximate the discharge opening, the pivotable louvers being pivotable between a shut position and an open position;
   wherein, in the shut position, individual louvers at least partially obstruct the discharge opening; and
   wherein, in the open position, individual louvers at least partially control a direction of flow of the bleed air exiting the discharge opening.

2. The louver system of claim 1, further comprising a first connecting rod operatively coupled to a first louver of the plurality of louvers and to a second louver of the plurality of louvers, the first connecting rod providing substantially coordinated pivoting of the first louver and the second louver.

3. The louver system of claim 2, further comprising a second connecting rod operatively coupled to a third louver of the plurality of louvers and to a fourth louver of the plurality of louvers, the second connecting rod providing substantially coordinated pivoting of the third louver and the fourth louver.

4. The louver system of claim 3, wherein the first connecting rod and the second connecting rod are independently operable.

5. The louver system of claim 1, wherein the plurality of pivotable louvers comprises at least two groups of louvers, each group of louvers being associated with a connecting rod providing substantially coordinated pivoting of the respective group of louvers.

6. The louver system of claim 1, further comprising an open position stopper arranged to limit pivoting of at least one louver of the plurality of louvers in an opening direction.

7. The louver system of claim 1, further comprising a shut position stopper arranged to limit pivoting of at least one louver of the plurality of louvers in a shutting direction.

8. The louver system of claim 1, wherein an individual louver comprises a trailing edge; wherein the trailing edge comprises a mixing feature; and wherein the mixing feature comprises at least one of a grooved edge, a scalloped edge, and a chevron-shaped edge.

9. A gas turbine engine, comprising:
   a compressor;
   a combustor arranged to combust fuel in compressed air received from the compressor;
   a turbine configured to receive hot, pressurized gas from the combustor and to drive the compressor;
   a bleed conduit arranged to receive bleed air from the compressor; and
   a louver system in a core engine casing, operatively coupled to the bleed conduit, the louver system comprising
   a plurality of louvers disposed in a discharge opening, the plurality of louvers being pivotable between a shut position and an open position.

10. The gas turbine engine of claim 9, wherein, in the shut position, the plurality of louvers substantially obstructs the discharge opening.

11. The gas turbine engine of claim 9, wherein, in the open position, the plurality of louvers are arranged to direct a flow of bleed air exiting the discharge opening.

12. The gas turbine engine of claim 9, further comprising
   a transient bleed valve fluidicly interposing the compressor and the bleed conduit; and
   a muffling device fluidicly interposing the bleed conduit and the discharge opening.

13. The gas turbine engine of claim 9, wherein the discharge opening is arranged to vent the bleed air into a bypass flow stream.

14. The gas turbine engine of claim 13, wherein, in the open position, the plurality of louvers is arranged to prevent bleed air impingement on a bypass duct wall.

15. A method of operating a bleed system associated with a gas turbine engine, the method comprising:
    receiving a flow of bleed air from a compressor of a gas turbine engine at a discharge opening in a core engine casing;
    pivoting a plurality of louvers disposed in the discharge opening from a shut position to an open position;
    discharging the flow of bleed air through the discharge opening; and
    directing the flow of bleed air through the discharge opening using the plurality of louvers.

16. The method of claim 15, further comprising
    substantially stopping the flow of bleed air from the compressor; and
    pivoting the plurality of louvers from the open position to the shut position, the louvers substantially obstructing the discharge opening in the shut position.

17. The method of claim 15, wherein pivoting a plurality of louvers disposed in the discharge opening from the shut position to the open position comprises
    pivoting a first group of pivotable louvers from the shut position to the open position, and
    maintaining a second group of pivotable louvers in the shut position.

18. The method of claim 17, further comprising pivoting the second group of louvers from the shut position to the open position in response to an increase in a flow rate of bleed air from the compressor.

19. The method of claim 15, wherein receiving the flow of bleed air from the compressor of the gas turbine engine at the discharge opening comprises flowing the flow of bleed air through a muffling device fluidicly coupled upstream of the discharge opening.

* * * * *